O. HERRMANN.
THERMOMETER.
APPLICATION FILED JUNE 1, 1914.
1,136,527.
Patented Apr. 20, 1915.
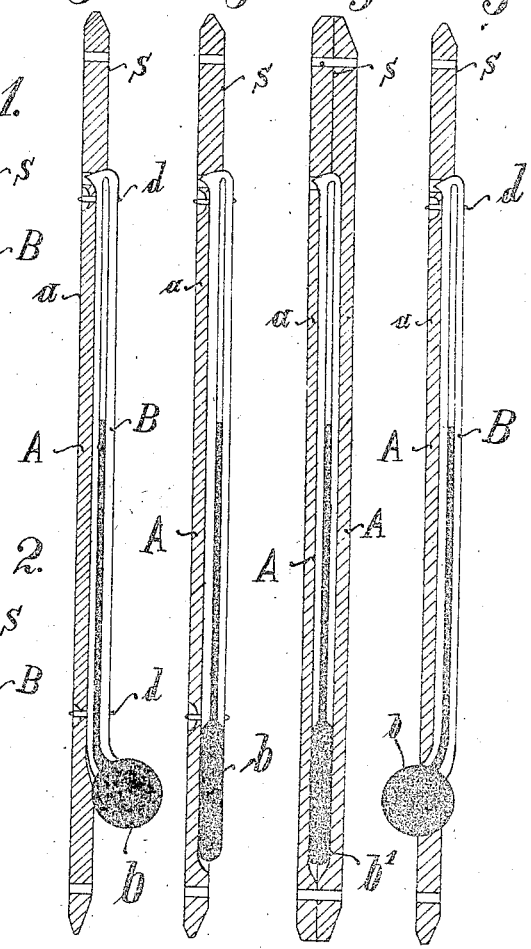

UNITED STATES PATENT OFFICE.

OTTO HERRMANN, OF MANEBACH, GERMANY.

THERMOMETER.

1,136,527.

Specification of Letters Patent.   Patented Apr. 20, 1915.

Application filed June 1, 1914.   Serial No. 842,129.

*To all whom it may concern:*

Be it known that I, OTTO HERRMANN, merchant, a citizen of the German Empire, and residing at Manebach, Germany, have invented certain new and useful Improvements in Thermometers, of which the following is a specification.

This invention relates to thermometers having their capillary tubes located in a groove in a glass plate.

Well-known glass-plate or window thermometers of the ordinary kind, in which the capillary tube provided with the bulb is mounted on the graduated side of the glass plate, have considerable parallax on account of the fairly large diameter of the tube, so that it is very difficult to read the thermometer exactly. If the capillary tube containing mercury is let into the glass plate without the base of the groove being polished, the thermometer can be read only from the enameled side in light shining through the plate. In incidental light the reading of the thermometer is possible not at all or only with difficulty, because on the enameled side of the glass the coating covers the scale, while on the smooth side the filament of mercury is covered by the rough surface of the groove. Therefore the means frequently employed with wooden or metal scales, *i. e.* letting the tubes up to half their diameter into the graduated base-plate, is not suitable for adoption in glass-plate thermometers which are to be read in incidental light and in light shining through from behind.

Forms of thermometers are also known in which the tube is mounted on the graduated side which is enameled with the exception of the narrow middle strip under the tube, the numerals being written in mirror script or reversed writing. These thermometers have a smooth graduated plate without a groove. The enamel coat covers only the graduations, and not the space under the mercury tube. Such an instrument can be read both from the enameled side or the other in light shining through the glass, but from the latter side only in incidental light. It has, however, considerable parallax because the mercury filament and the scale are not located in one plane. This is not the case in another known construction, in which the graduated glass plate has a slot-like cut for receiving the tube. The cut is, however, unsuitable for technical reasons and owing to the appearance, because the attachment of the tube is more difficult and the otherwise smooth reading surface is not continuous, which looks unsightly and makes it difficult to clean the surface.

According to my invention I make a groove in the rear of the glass plate and provide it with a polished surface, the height of the liquid and the scale, provided in known manner on the rear of the glass plate, being read together through the glass plate.

The invention consists in the construction, arrangement and combination of parts described hereinafter and pointed out in the claims.

Several illustrative embodiments of the invention are represented by way of example in the accompanying drawing, wherein:—

Figures 1 and 2 are horizontal sections showing two forms of my improved thermometer, and Figs. 3 to 6 are vertical sections showing various modes of mounting the tube on the glass plate.

Referring firstly to Fig. 1, this thermometer consisting of the capillary tube B mounted on the graduated glass plate A has the simplest form of groove *c* in which the tube is mounted, the groove being of rectangular section. In all the figures *s* designates the rear of the glass plate provided with the scale and *a* the front side from which the thermometer is read. The bottom of the groove, *i. e.* the face nearest the side *a*, is smooth and polished, while the sides may have any desired shape, but such that the groove has a trapezoidal section.

In Fig. 2 the groove *c'* has its polished bottom curved inward, *i. e.* toward the tube B. When observing the thermometer from the front the filament of liquid will appear greatly magnified transversely. Without impairing the distinctness the tube can consequently be made narrower and the bulb smaller than is otherwise suitable. If the base of the groove were curved in the opposite direction the effect would be the reverse.

Fig. 3 shows a thermometer having its tube B attached in the known manner by means of two clamps *d*, the spherical bulb *b* being located outside the glass plate A, and Fig. 4 shows a similar thermometer except that the cylindrical bulb *b¹* is half sunk into the glass plate and is of a modified form.

In the thermometer shown in Fig. 5 the tube B and its bulb b' are inclosed between two glass plates A, each of which has a recess for the bulb as in the plate A in Fig. 4. In this form also the plane of the scale coincides with the plane of contact of the two plates.

Thermometers of very various kinds can be made in the described manner including, for example, the two-limbed six thermometer.

Fig. 6 shows a specially advantageous form of thermometer. In this the graduated plate A is provided at the lower end of the groove with a large hole which tapers so much toward the rear of the plate that the bulb cannot pass through it. The tube B is inserted through the hole from the front, laid into its groove and attached above to the plate by one single clamp d. A second attachment is not necessary because the bulb is supported in the said hole in the plate.

I claim:—

1. In a thermometer, the combination of a glass plate graduated on the rear side and a capillary tube having a bulb mounted thereon, said plate having a groove in the rear side thereof in which the tube is located, the bottom of the groove being polished and curved toward the tube.

2. A thermometer comprising in combination two glass plates each having a groove in the rear thereof placed back to back, and a capillary tube having a bulb in the grooves between the plates, the bottom of each groove being polished, and the rear of one of the plates being graduated.

In testimony whereof I affix my signature in the presence of two witnesses.

OTTO HERRMANN.

Witnesses:
  ALFRED HOFFMANN,
  FERD. BESKER.